United States Patent
Berman et al.

[11] Patent Number: 6,134,346
[45] Date of Patent: Oct. 17, 2000

[54] METHOD FOR REMOVING FROM AN IMAGE THE BACKGROUND SURROUNDING A SELECTED OBJECT

[76] Inventors: Arie Berman, 11454 N. Poema Pl. #102, Chatsworth, Calif. 91311; Arpag Dadourian, 11333 Yolanda Ave., Northridge, Calif. 91326; Paul Vlahos, 5828 Calvin Ave., Tarzana, Calif. 91356

[21] Appl. No.: 09/008,270

[22] Filed: Jan. 16, 1998

[51] Int. Cl.⁷ .............................. G06K 9/00; G09G 5/00
[52] U.S. Cl. .................... 382/163; 382/162; 382/167; 345/114
[58] Field of Search .................... 382/162, 163, 382/167; 348/577, 586, 587; 358/519, 521; 345/114, 336

[56] References Cited

U.S. PATENT DOCUMENTS

| | | | |
|---|---|---|---|
| 4,625,231 | 11/1986 | Vlahos | 348/587 |
| 4,857,994 | 8/1989 | Beimares-Sarabia et al. | 348/586 |
| 5,032,901 | 7/1991 | Vlahos | 348/587 |
| 5,343,252 | 8/1994 | Dadourian | 348/587 |
| 5,400,081 | 3/1995 | Chaplin | 348/587 |
| 5,424,781 | 6/1995 | Vlahos | 348/587 |
| 5,515,109 | 5/1996 | Vlahos et al. | 348/587 |
| 5,621,816 | 4/1997 | Ruppert | 382/163 |
| 5,742,354 | 4/1998 | Vlahos et al. | 348/586 |
| 5,867,284 | 2/1999 | Heinrichs et al. | 382/167 |

Primary Examiner—Phuoc Tran
Assistant Examiner—Daniel G. Mariam

[57] ABSTRACT

A computer implemented method to extract a selected subject from its background, by removing the background, including that portion of the background visible through semi transparent areas of the subject, and generating a matte signal containing a record of background levels outside of and within semitransparent subject areas. The observed RGB signal levels of a pixel in the semitransparent transition between a subject and its background, are a mixture of color contributed by the subject, and by the background. The estimated subject color, and the estimated background color, and the observed color of a transition pixel (pixRGB), may be shown as three points in a three dimensional color space.

19 Claims, 5 Drawing Sheets

THREE DIMENSIONAL COLOR SPACE    FIG. 2

METHOD FOR REMOVING FROM AN IMAGE THE BACKGROUND SURROUNDING A SELECTED OBJECT

BACKGROUND

In the graphic arts and in motion pictures, it is often desirable to isolate a subject or element, in a photographic image, from its surrounding background in order to place it against a different background. The process of removing the background is called stripping in the graphic arts, and was once done with a pair of scissors or razor blade.

In the motion picture industry, when the desired background is not available, the subject is photographed against a colored backing which is subsequently replaced by a suitable background scene with a travelling matte compositing process such as described in U.S. Pat. No. 4,625,231.

There are occasions however, when the subject is not photographed against a background suitable for travelling matte compositing. In this case, the unwanted portions of the scene surrounding the subject are removed by hand, one frame at a time. This process is known as Rotoscoping and was once done by hand painting enlarged frames of the image. Today the stripping and hand painting is done on a color monitor using a computer, mouse and cursor, or equivalent. In either case the work is slow and tedious, and it is difficult, if not impossible, to properly reproduce full hair detail and subjects that are semitransparent.

Another process, called difference matting, photographs the scene twice, once with subject removed to produce a Clear Frame, and a second time with subject in place. The Clear Frame is an image frame in which all subject matter has been cleared from the set. By subtracting the Clear Frame from the subject frame, one obtains a zero signal for every pixel in the background area. When the difference at a given pixel deviates from zero, that pixel contains elements of the subject. This remainder is rejected in favor of retaining the subject. The subject then appears to have been photographed against a black backing. However, this technique does not remove background elements from semitransparent areas in the subject.

INVENTION OBJECTIVE

All photographed objects have semitransparent edges to some extent, due either to the modulation transfer function of the lens, lens depth of field, object or camera motion, or because the object itself is semi-transparent (or translucent).

The objective of this invention is to extract a selected subject from its background, by removing the background, including that portion of the background visible through semi transparent areas of the subject, and to generate a matte signal containing a record of background levels outside of and within semitransparent subject areas.

BRIEF SUMMARY OF THE INVENTION

Figure 2:
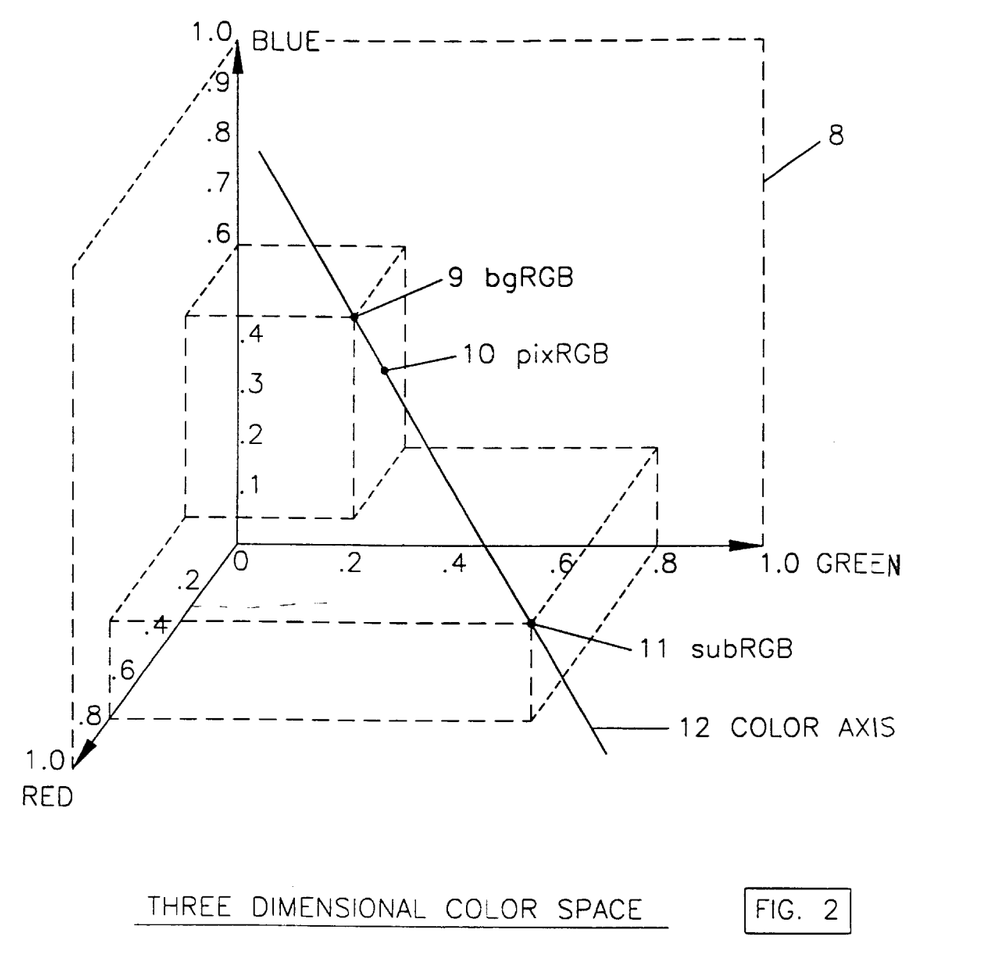
FIG. 2 shows a background (bg) color, a subject (sub) color, and a transition pixel (pix) color in a three dimensional color space.

The observed RGB signal levels of a pixel in the semi-transparent transition between a subject and its background, are a mixture of color contributed by the subject, and by the background. The estimated subject color (subRGB), and the estimated background color (bgRGB), and the observed color of a transition pixel (pixRGB), may be shown as three points in a three dimensional color space (FIG. 2).

As observed in color space, a transition pixel (pixRGB) will lie on a color axis connecting bgRGB and subRGB. The percentage contribution of the background color to a pixel in the transition area depends on the proximity of that pixel color to the background color, and may be calculated as the ratio of two line lengths in color space, (pixRGB—subRGB) (bgRGB—subRGB). The calculation of this ratio is made by inserting a function of RGB for pix, sub, and bg at those three points in color space.

The calculation of percentage background contribution for all the pixels in the image frame will result in zero in the background area, 1.0 in the opaque subject area, and somewhere between zero and 1.0 in the transition area. These numbers represent the matte signal, also known as the alpha channel.

When the estimated background is multiplied by the matte signal, and this product is subtracted from the original scene, the remaining scene is the Processed Foreground with background removed, including elements of the background visible through semitransparent areas of the subject.

A new background, when multiplied by the matte signal, may be added to the Processed Foreground, and will be visible through semitransparent areas of the foreground subject to the extent the subject is transparent.

DETAILED DESCRIPTION OF THE METHOD

Boundary Lines

Figure 1:
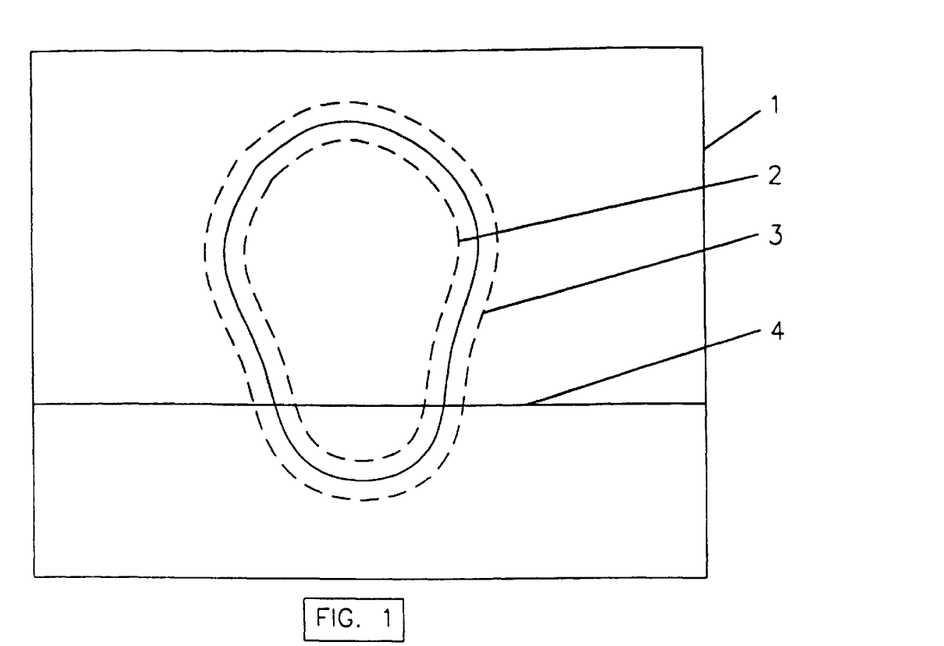
FIG. 1 shows a subject with inner and outer boundary lines.

The image is typically stored in computer memory and displayed on a color monitor (1). Referring to FIG. 1, and using the mouse and cursor (or equivalent), a boundary line, 2, is hand drawn on the subject near the subject's edge. The RGB levels for each pixel on this line are then known to represent only the subject. A second boundary line, 3, is drawn on the background far enough from the subject to be certain that all elements of the subject, including semitransparent areas, are avoided. The boundary lines are drawn near the edge of the subject (or background) without attempting to locate the physical edge of the subject. That is, the boundary lines should be drawn such that the color of the pixels under each line is approximately the same as the color of the pixels at the edge of the subject. The closer this approximation, the better the results would be, however, it should be understood that the boundary line need not be close to the edge in absolute terms of distance. If the color near the center of the subject is approximately the same as the color at the edge of the subject, then the boundary line can be drawn around the center even though the center is not near (in distance) to the edge. Similarly, if the subject has numerous colors, then the boundary line should be drawn relatively close (in distance) to the edge to obtain the best results.

The address and the RGB levels of each pixel defining the interior and exterior hand drawn boundary lines are stored in memory. The area between these two boundary lines is the bounded area.

Somewhere in the bounded area lies the actual semitransparent area in which the transition occurs between the subject of interest and the adjacent background. The RGB levels of pixels in this transition area are comprised of RGB signal contributions from both the subject and the background. This transition area may be smaller than a pencil line, or wide enough to fill the bounded area.

In addition to the original image frame, four additional frames are generated. These include a Clear Frame, an Expanded Subject Frame, a Matte Frame, and a Processed Foreground Frame.

Clear Frame

The Clear Frame is a frame of the background before the subject entered the scene. Since such a true Clear Frame is rarely available, an estimated Clear Frame may be generated by extrapolating and or interpolating the RGB levels on and outside the outer boundary line to replace all RGB data enclosed by the outer boundary line. The RGB levels of the Clear Frame within the bounded area must be known (or be a good estimate) if the background contribution to a pixel in the transition area is to be accurately determined.

In the field of motion pictures, the fact that the subject moves about the set often permits the assembly of a true clear frame in sections from a succession of film frames. The availability of a true clear frame, eliminates the need to interpolate RGB levels to obtain an estimated clear frame.

Expanded Subject Frame

The RGB data along the inner boundary line on the subject, is expanded outwards through the bounded area to generate an Expanded Subject Frame, which will be used in the subsequent determination of the percentage background contribution to pixels in the transition area. The expansion outward from the inner boundary line is accomplished by extrapolation of the data inside the boundary line to fill the bounded area. This Expanded Subject Frame provides an estimate of the color of the opaque subject contributing to the color of pixels in the transition area.

The Matte Frame

The Matte Frame is the percentage contribution of the background to pixels in the image frame, and is a black silhouette of the opaque subject against a white field. It is also identified as the alpha channel. The Matte Frame represents the level of the background scene to be subtracted from the original scene to create a Processed Foreground Frame. The Matte Frame also controls the level of a new background scene to be inserted behind the subject.

The Processed Foreground Frame

The Processed Foreground Frame is a frame showing the extracted subject with all elements of the background removed, including those portions of the background that were visible through semitransparent areas of the subject. The Processed Foreground is generated by multiplying the Clear Frame by the Matte Frame and subtracting this product from the original scene RGB, leaving the subject in full color against a black field.

Interpolation/extrapolation

The term "interpolation" is the determination of intermediate values between two known values, and the term "extrapolation" is the estimating of values beyond a known range on the basis of values within a known range. In the generation of the Clear Frame, the most accurate estimate of the RGB levels in the bounded area is obtained by extrapolation of levels outside the outer boundary, combined with interpolation of these extrapolated levels across the bounded area.

While interpolation and extrapolation are generally linear, a more accurate estimate of the Clear Frame and of the Expanded Subject Frame can often be achieved by using nonlinear interpolation and/or extrapolation.

Extrapolation is used when one edge of the subject touches an edge of the frame, or when a background object having a pronounced edge protrudes into the bounded area, at an angle or on an arc. The information provided by such an object may be extrapolated into the bounded area thus improving the estimate of the RGB levels in the clear frame.

The interpolation and/or extrapolation may, but need not, proceed beyond the bounded area because the region of interest is the transition area which lies within the bounded area. For simplification, the term "interpolation", as used herein, may also include the function of "extrapolation", and vice versa. The choice of one or the other, or both, depends upon the nature of elements in the subject and background, and their location in the frame.

Figure 3:
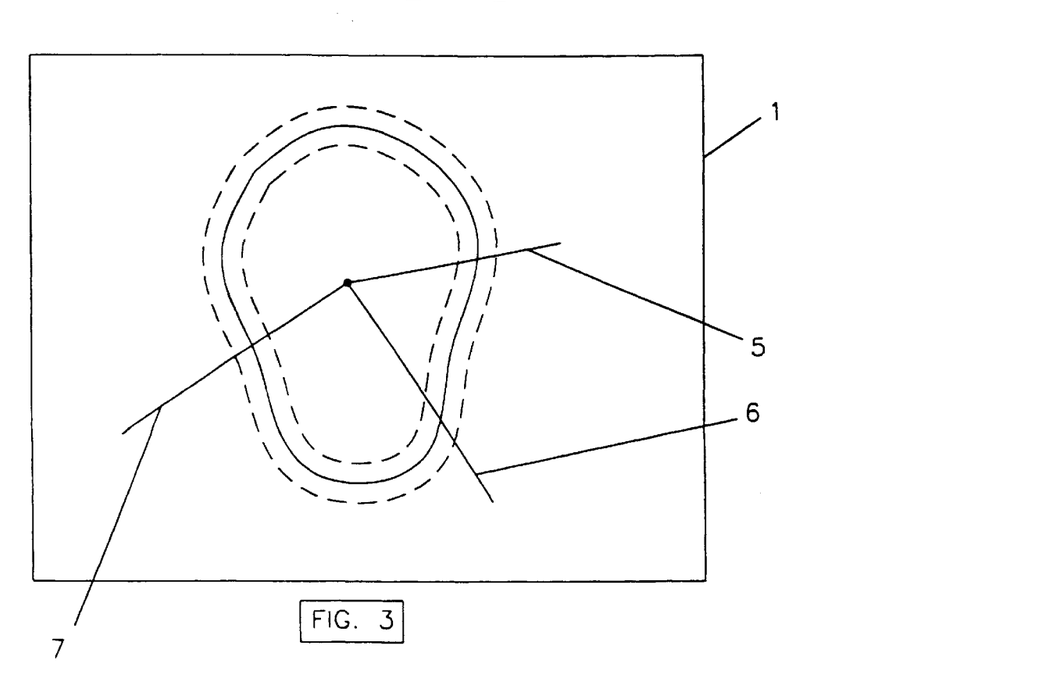
FIG. 3 shows a subject with radial scan lines.

It should be noted that the generation of a Clear Frame and an Expanded Subject Frame serve only the purpose of providing a good estimate of the RGB levels of the subject and background colors before they are mixed in the transition area. For this purpose, a scan line that crosses the two boundary lines at a suitable angle, as in FIG. 3, identifies the RGB levels of the background and subject at the boundary lines. These levels may then be assigned as the estimated full level foreground RGB and full level subject RGB, for all pixels on said scan line, without generating the Clear Frame or the Expanded Subject Frame. As an alternative, the foreground and background colors can be simply declared (adjusted) while observing the result.

Weighting Functions

When subject contours are complex, interpolation and extrapolation may be required in other axes, in addition to horizontal, to improve the estimated RGB levels in the Clear Frame. For example, to interpolate from the perimeter of a region (bounded area) into its interior, calculate, for each point within the region, a weighted average of values (RGB levels) from the perimeter, giving the greatest weight to perimeter points at the shortest distance.

A useful variation of weighting the influence of perimeter points, to a point in the bounded area, is to give the greatest weight to the nearest perimeter point, and to linearly decrease the weighting to zero at a perimeter point at twice the distance of the nearest perimeter point.

If a perimeter point is very close to the given interior point, very few if any other perimeter points will have an influence (a non zero weight). Since the number of points on the perimeter can be large, calculation can be limited to a selected sampling of these points.

The color values observed at a given pixel in the bounded area may be used to help determine the weighting to apply to the color values of pixels on the perimeter (boundary line). It is possible to calculate a weighted average of values from the perimeter, where the weight not only depends on distance, as described above, but also, or even exclusively, on the level of match between the color values observed at the given interior pixel and the color values at a respective perimeter point.

Color Space

Referring to FIG. 2, three colors are shown as three separate points 9, 10 and 11 in a three dimensional color space (8). All three colors exist at the same pixel address in three different image frames. Point 9, shown as bgRGB in the three dimensional color space of FIG. 2, represents the RGB levels of the background, obtained from the Clear Frame. Point 11 in color space, labeled subRGB, represents the RGB levels of the subject, obtained from the Expanded Subject Frame. A line 12 connecting these two color points is a color axis. The observed RGB levels of pixel 10 in the transition area are shown as a point labeled pixRGB, lying on the color axis connecting points bgRGB and subRGB, since pixRGB consists of contributions from both.

The RGB levels obtained from the Clear Frame and from the Expanded Subject Frame are usually calculated estimates. Errors in these estimates will displace the color axis. Therefore point 10, representing the observed pixRGB, will be offset from this axis. The effect of such error is minimized by observing the position of the color axis from different perspectives. This is done by multiple calculations described below.

When a pixel in the transition area lies close to the background, as in FIG. 2, the contribution of background RGB is very large. When the pixel is quite close to the subject, the contribution of RGB from the background is very small. As may be seen by examining FIG. 2, the percentage contribution of the background to the transition pixel is proportional to the distance from "pix to sub", divided by the distance "bg to sub".

These distances refer to distances in color space between three colors from three different image frames at a single address, not to a physical distance on the image.

Using this visualization of color space, the contribution of the background color to the color of a given pixel is determined by Eq. 1 which expresses the relative position of a point along a line segment. It is necessary to determine the contribution of the background color to pixels in the transition area so that the background may be subtracted, thus leaving only the contribution of the subject.

$$\% \text{ Contribution of } bgRGB = \frac{\text{distance }(pixRGB, subRGB)}{\text{distance }(bgRGB, subRGB)} \quad \text{Eq.-1}$$

where;
distance: is a function yielding the distance in color space between two colors,
pixRGB: is the RGB of any pixel in the image frame, although it is generally limited to the bounded area, to save computation.
subRGB: is the RGB of the corresponding pixel (a pixel at the same position) in the Expanded Subject Frame, and
bgRGB: is the RGB of the corresponding pixel in the Clear Frame. The percent contribution of the background to a pixel in the bounded area is the ratio shown in Eq. 1. The calculation of distance in color space between two pixels (pixRGB) to (subRGB), or (bgRGB) to (subRGB) is achieved by subtracting their RGB levels, or a function of their levels, to obtain their color difference.
Thus: distance(pixRGB,subRGB)=F(pixRGB)—F(subRGB), and distance(bgRGB,subRGB)=F(bgRGB)—F(subRGB),
Where F can be any function which assigns a single number to any triplet of numbers (e.g. RGB color), such as any linear function of the form:

$$Fn(pixRGB)=k_1R+k_2G+k_3B \quad \text{Eq.2}$$

From this equation dozens of functions may be generated. Each function examines the color axis from a different perspective. Not all of the possible functions, that can be generated by Eq. 2, provide good results for all colors, therefore a selected group of functions, F1 . . . F6, are used in estimating the percentage contribution of background RGB.

The following six functions of F are found to be useful;
$F_1$=B-G,
$F_2$=B-R
$F_3$=G-R
$F_4$=R
$F_5$=G
$F_6$=B
Using the functions F above, Eq. 1 is rewritten as;

$$\% \text{ Contribution of Background} = \frac{F(pixRGB) - F(subRGB)}{F(bgRGB) - F(subRGB)} \quad \text{Eq.-3}$$

Where F(RGB) is one of the functions F1 to F6.

Those results obtained where the denominator in Eq. 3 is very small are thrown out, and the remainder are weighted and averaged, giving the greatest weight to the calculation using the largest denominator. This method of weighting reduces the effect of noise uncertainty, and digital computation error when the denominator is very small. The weighted average also reduces the effect of errors in estimating RGB levels in the Clear Frame and Expanded Subject Frame.

Another weighting technique is a weighted average for each term in Eq. 3, proportional to F(bgRGB)—F(subRGB)—offset, where offset may be set to half of the largest denominator of Eq. 3. The particulars of the weighting function employed is not critical to an understanding or use of the invention.

Good results are also obtained by selecting the single calculation, in Eq. 3, having the largest denominator. It should also be noted that bgRGB, and subRGB can be "declared" by an operator, and used as operator adjustments in calculating the matte frame of Eq. 3, so that these equations become alternative matte computations even without the Clear Frame and Expanded Subject Frame. In Eq. 3, it is only necessary for an operator to declare (adjust) the value F(subRGB) and/or F(bgRGB), without considering the subRGB or bgRGB obtained from the Clear Frame and Expanded Subject Frame.

However, the better the estimate of foreground and background colors contributing to the observed color of a given transition pixel, the more complete is the removal of the background in the transition area, especially for complex subjects and complex backgrounds.

The above calculation, of percentage background contribution using equation 3, is valid for all pixels in the full image frame, and will provide a 1.0 in the background area, and a 0.0 in the opaque subject area, with values greater than zero and less than 1.0 in the transition area. Therefore, computation is restricted to pixels within the bounded area to save computation time.

The assigned 1.0 for the background area, plus the background contribution in the transition area, plus the assigned 0.0 in the subject area, together constitute the Matte Frame, (also described as the matte or alpha channel). When the Clear Frame is multiplied by the Matte Frame as defined above, and this product is then subtracted from the original scene, the remainder is the Processed Foreground signal which is the subject as it would have appeared when photographed against a black backing.

A new background scene is inserted by multiplying its RGB signals by the Matte Frame and adding their product to the Processed Foreground Frame.

REVERSE MATTES

Extracting a subject from its background is readily accomplished using a uniform backing. A subject is also readily extracted when the background is soft (e.g., out of focus).

These backgrounds, when interpolated to fill the area within the bounded area, provide a very good estimate of the background color contributing to the color of pixels in the semitransparent subject area. In each of the above cases, planning is required to obtain a suitable uniform backing, or to place the subject away from the background so that a wide aperture lens will result in an out of focus background.

It is the unplanned scene that causes difficulties, especially when the desired background is in sharp focus, and is very detailed. A suitably accurate Clear Frame cannot be obtained by extrapolation and/or interpolation from a focused detailed background.

The estimated background contribution to pixels in the transition area is therefore inaccurate. Residual elements of the background will therefore be seen in the semitransparent areas of the extracted subject, and will require pixel by pixel hand work for their removal.

Further examination of these same scenes show that a large proportion of the subjects have rather uniform colors, with reasonably uniform edges. Most of the hand work on these unplanned scenes may be eliminated by first determining the contribution of the subject color to pixels in the transition, rather than finding the contribution of the background color as described earlier.

By using a reverse matte (1-matte), the contribution of the subject is subtracted from the image, leaving a Processed Background, which is the original scene with a black silhouette of the subject. A detailed explanation of employing a reverse matte, and the subsequent manipulation of the four image frames described earlier, is best made by examining the following equations.

Eq. 3 listed earlier, generates a normal matte and is repeated here for reference.

$$M = \frac{F(pixRGB) - F(subRGB)}{F(bgRGB) - F(subRGB)} = M1 \quad \text{Eq. 3}$$

where M is designated M1 to indicate that it is the first matte, since there will be developed a second matte M2 later.

The M1 matte=1.0 in the background
and=0.0 in the foreground

One may compute the direct matte M1 from equation 3, and then subtract it from 1.0 to get (1−M1), or one may compute the reverse matte directly from equation 4 below.

$$\text{Reversed Matte } (1 - M1) = \frac{F(brRGB) - F(pixRGB)}{F(bgRGB) - F(subRGB)} \quad \text{Eq. 4}$$

where (1−M1)=Reversed Matte, which is
0.0 in the background, and is
1.0 in the foreground Processed Foreground 1, (PrFg1) is obtained from Eq. 5, $$PrFg1=(1-M1)*subRGB \quad \text{Eq. 5}$$

where subRGB are pixels obtained from the Expanded Subject Frame.

This Processed Foreground 1 is not exactly the same as the normal Processed Foreground because it differs at the Bg/Fg transition.

The normal PrFg is quite accurate where the transition pixels are close to the background. PrFg1 is most accurate where the transition pixels are close to the subject.

$$PrBg1=pixRGB-PrFg1 \quad \text{Eq. 6}$$

where: PixRGB represents pixels from any where in the image frame, Thus the equation reads: "the background is the original image, less the foreground". Since PrBg1 is the Processed Background, defined here as a background with a black hole formerly occupied by the subject, the busy focused background will be quite accurate all the way to the non existent subject.

$$(1-M1)*bgRGB=bgRGB2 \quad \text{Eq. 7}$$

where: bgRGB is the Clear Frame and bgRGB 2 is the Reversed Clear Frame

The reversed matte (1−M1) is 0.0 except in the subject, causing the reversed clear frame to be black except in the subject area.

Percent contribution of the background, bgRGB3 is generated by summing Eq. 6 and Eq. 7.

$$PrBg1(\text{Eq.6})+bgRGB2(\text{Eq.7})=bgRGB\ 3 \quad \text{Eq. 8}$$

The final matte M2 is generated from equation three, except that bgRGB3 now substitutes for bgRGB.

$$M2 = \frac{pixRGB - subRGB}{bgRGB3 - subRGB} \quad \text{Eq. 9}$$

$$pixRGB-(M2*bgRGB3)=PrFg2 \quad \text{Eq. 10}$$

In equation 10, Matte M2 multiplied by bgRGB3, (which is the percentage contribution of the background) when subtracted from pixRGB (which is the original image), results in the subject against a black background. PrFg2 is the final Processed Foreground with no residual background in the background area nor in semi transparent areas of the subject.

While the process of reversing the matte and generating the intermediate steps is quite complex, it manages to get the sharp detail of pixels in the transition area close to the background, into both the numerator and denominator of equation 9, where it cancels. The cancellation causes the background, even if very busy, to be removed from the image frame and from semitransparent areas of the subject.

A TWO DIMENSIONAL COLOR SPACE

While FIG. 2 illustrates a three dimensional color space, one can obtain similar results by converting RGB to a two dimensional color representation such as the well known CIE Chromaticity Diagram.

The RGB levels of the subject and background will appear as two points on this Chromaticity diagram. The RGB levels of a given pixel in the transition area will appear as a third point on a line connecting the colors of the subject and background. The percentage contribution of the background to a pixel in the bounded area may be computed as the ratio of two line lengths on the CIE Chromaticity diagram, as was done for three dimensional color space.

IMPLEMENTATION

Figure 5:
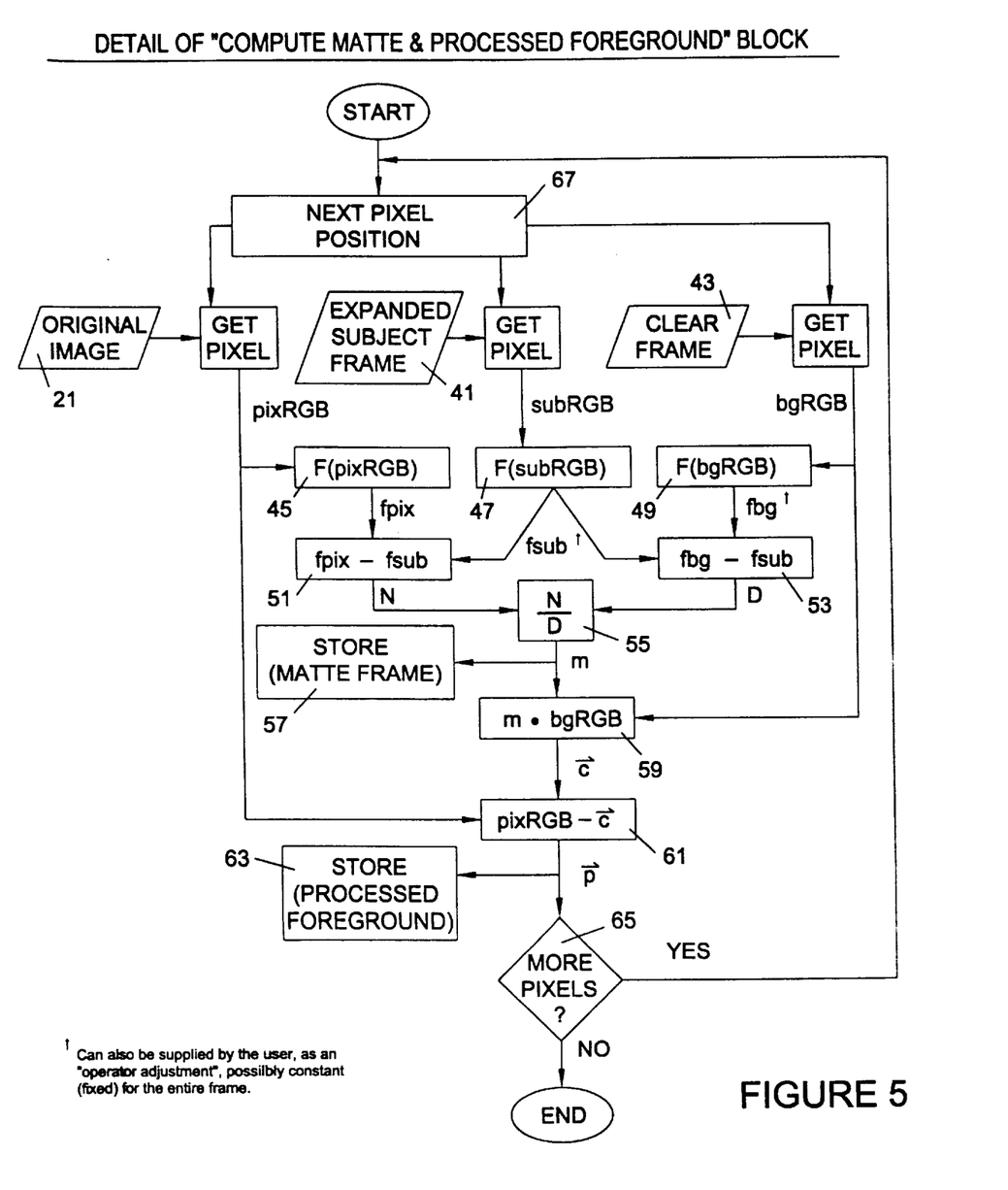
FIG. 5 is a detailed block diagram of the "Compute Matte and Processed Foreground" block (35) of FIG. 4.
Figure 6:
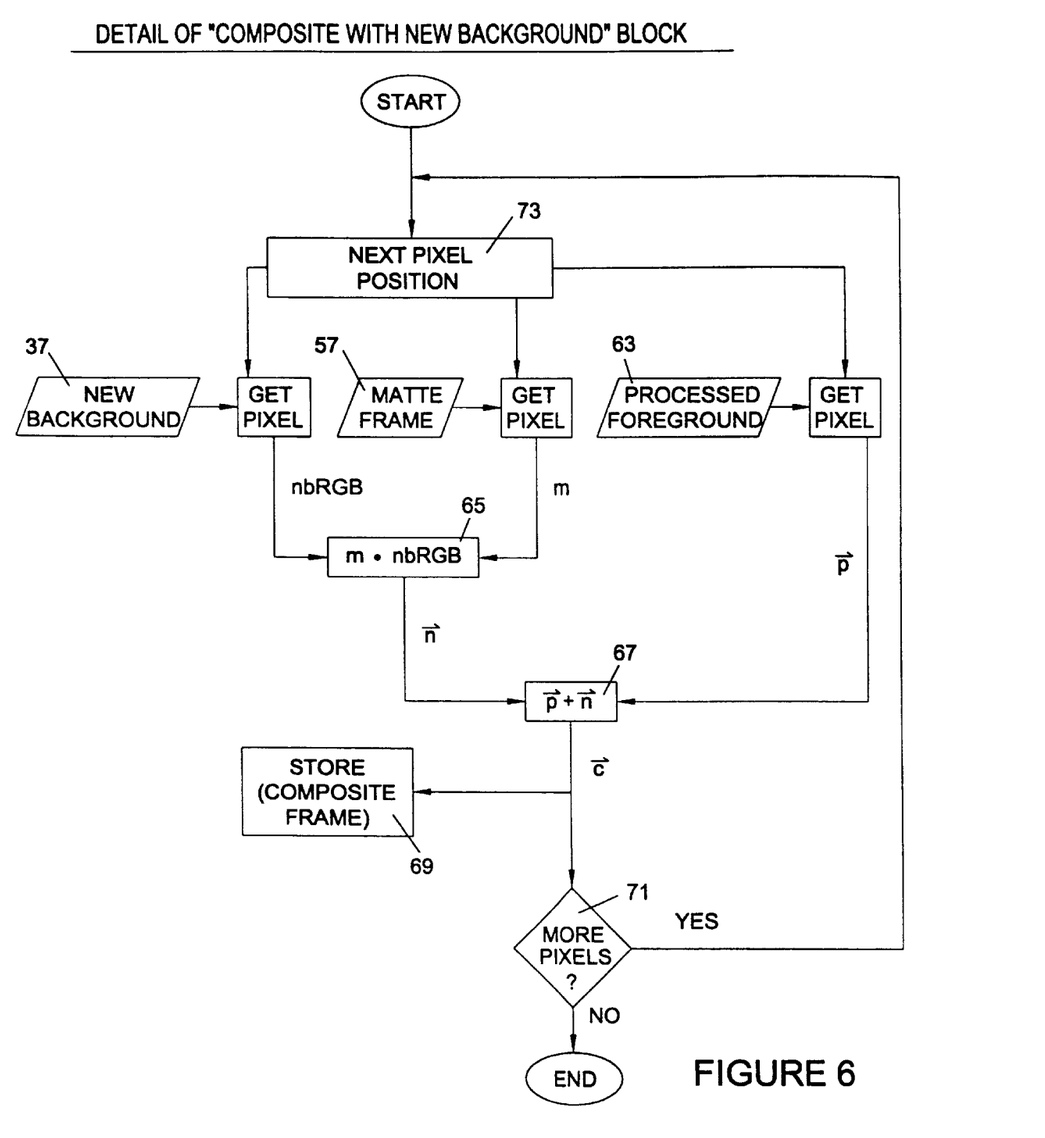
FIG. 6 is a detailed block diagram of the "Composite With New Background" block (39) of FIG. 4.

While it is currently possible to construct a hardware device to perform the calculations indicated in non real-time, a software implementation is preferred because operations on an image are customarily done with software, and because software is flexible, easily updated and relatively inexpensive. In this connection, FIGS. 4, 5 and 6 show, in block diagram form, how the invention may be implemented.

Figure 4:
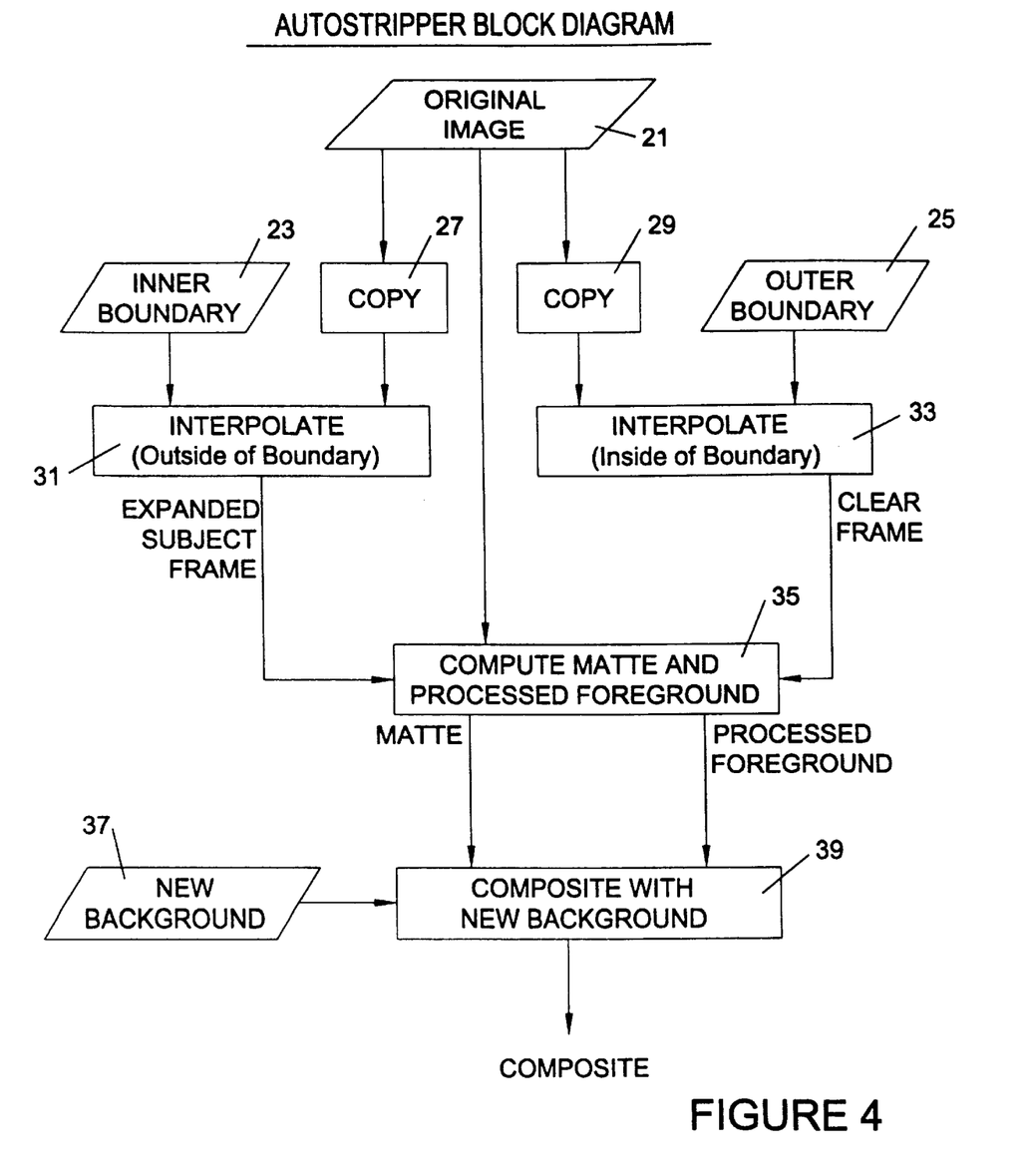
FIG. 4 is a block diagram showing how the invention may be implemented.

FIG. 4 is a logic flow diagram showing the entire process, including the insertion of a new background.

Referring to FIG. 4, given:
  a. the "original image" (21) such as an image in Adobe Photoshop format,

9 b. an "inner boundary" (23) which encloses regions deemed to be pure subject with no background influence, and excludes regions deemed to be background or contaminated with background color, and c. an "outer boundary" (25) which excludes regions deemed to be subject, or contaminated with subject color.

1. Make two copies 27 and 29 of the original image.
2. In the first copy (27), fill the region outside the "inner boundary" (31) by interpolation from the colors found on this boundary. Call the result the "expanded subject" frame.
3. In the second copy (29), fill the region within the "outer boundary" (33) by interpolating from the colors found on this boundary. Call the result the "clear frame".

In FIG. 4, block 35 "Compute Matte and Processed Foreground", is described in detail with the aid of FIG. 5. Referring to FIG. 5, for each pixel position, compute the "matte frame" (57), and the "processed foreground" frame (63), as follows:

Matte (57)=$F(pixRGB)-F(subRGB) / F(bgRGB)-F(subRGB)$ (if matte<zero, reset to zero)

where:

pixRGB, is the pixel color taken from the original image (21), subRGB, is the pixel taken from the "expanded subject frame" (41), bgRGB, is the pixel color taken from the "clear frame" (43).

Referring to FIG. 5, for each new original image 21, an "expanded subject frame" 41 is generated from the "interpolate" block 31, of FIG. 4; a "clear frame" 43 is generated by the "interpolate" block 33 of FIG. 4; an original image pixel (pixRGB), a subject pixel (subRGB), and a background pixel (bgRGB), having a function F(pixRGB) 45, a function F(subRGB) 47, and a function F(bgRGB) 49, respectively generate fpix, fsub, and fbg.

The value fpix- fsub is calculated in block 51, and the value of fbg-fsub is calculated in block 53, forming variables N and D, which are divided as shown in block 55, forming a matte pixel m which is stored as shown in block 57. the matte signal m from 55 is multiplied by bgRGB (59), and the result is subtracted from pixRGB (61), the output of which is stored as the "processed foreground" in block 63. If there are more pixels 65, the next pixel position 67 is obtained and the process continues until all pixels in the image have been processed.

In FIG. 4, block 39 "Composite with New Background" is described in detail with the aid of FIG. 6.

FIG. 6, represents the details of compositing a new background image with the processed foreground, using the matte channel. This process is performed one pixel at a time, using data from the "New Background" frame 37, the "Processed Foreground" frame, 63, and the "Matte Frame", 57.

The pixel from the new background nbRGB and the matte pixel m are multiplied together as shown in block 65, and this product is added to the pixel from the processed foreground as shown in block 67, the output of which forms the composite image frame which is stored as shown in block 69. The next pixel position is obtained as shown in block 73 and the process continues until all pixels have been processed.

We claim:

10

1. A method for extracting a selected subject from an image, including those portions of the subject that are semitransparent, by removing all elements of the background surrounding the subject, and also removing those background elements visible through semitransparent areas of the subject, where said method comprises the steps of;

a) drawing, on a display of said image, an inner boundary line on the subject near to an edge of said subject, b) drawing an outer boundary line on said display, on the background near to the subject, but spaced at a distance sufficient to avoid inclusion of any element of said subject, c) generating a Clear Frame by filling the area inside said outer boundary line with RGB levels generated by interpolation and/or extrapolation of the RGB levels existing on and/or outside said outer boundary line, d) generating an Expanded Subject Frame by replacing the RGB levels in the area bounded by said inner and outer boundary lines with RGB levels generated by extrapolation of the RGB levels existing on and/or inside said inner boundary line, e) calculating an estimated Percent Background RGB Contribution (Matte Signal) to each pixel in the bounded area using equation:

percentage background contribution=$(F(pixRGB)-F(subRGB)) / (F(bgRGB)-F(subRGB))$, where: F is any linear function of the form, $F(RGB)= k_1R+k_2G+k_3B$, pixRGB is observed RGB at a pixel at a given address in the bounded area, subRGB is RGB obtained from the Expanded Subject Frame at said given address, bgRGB is RGB obtained from the Clear Frame at said given address, f) generating a Matte Frame by assigning a matte value of 1.0 to all pixels outside said outer boundary line, and assigning a matte value of 0.0 to all pixels inside said inner boundary line, and including the bounded area matte signal of step 'e' to complete the full Matte Frame signal, g) multiplying RGB levels at each pixel in the Clear Frame by the matte signal at the corresponding pixel in the Matte Frame to form their product, h) subtracting said product from the RGB levels of the original image to result in a Processed Foreground image of the subject, where said subject appears to have been photographed against a black backing, with no residual elements of the background remaining in the background nor in semitransparent areas of the subject.

2. The method of claim 1 in which the generation of the Expanded Subject Frame is limited to the bounded area.

3. The method of claim 1 in which the generation of said Clear Frame is limited to that portion of the frame within the bounded area.

4. The method of claim 1 in which the function F(RGB) employed in calculating the percent contribution of the background is one or more of the following:

$F_1(RGB)=B$,
$F_2(RGB)=G$
$F_3(RGB)=R$
$F_4(RGB)=B-G$
$F_5(RGB)=B-R$
$F_6(RGB)=G-R$.

5. The method of claim 1 in which the percentage contribution of the background to a pixel in a transition area is obtained from a ratio, and said ratio is computed for the functions $F_1(RGB)=B$,
$F_2(RGB)=G$
$F_3(RGB)=R$
$F_4(RGB)=B-G$
$F_5(RGB)=B-R$
$F_6(RGB)=G-R$ and said percentage background contribution is a weighted sum of said ratios, and said weighting increases as a absolute difference of the denominator of said ratio increases.

6. The method of claim 1 in which the Matte signal in the bounded area is that calculation that results in a largest denominator when calculating percent contribution of the background.

7. The method of claim 1 in which said semitransparent subject area is defined as those pixels within the bounded area where said percent contribution of the background is greater than zero and less than 1.0.

8. The method of claim 1 in which said estimated foreground and background colors at corresponding positions in the Clear Frame and Expanded Subject Frame are assigned by an operator.

9. The method of claim 8 in which the assigned foreground and assigned background colors are those existing at the inner and outer boundary lines where a scan line crosses said boundary lines and also crosses said given pixel in the bounded area.

10. A method for extracting a selected subject from an image, including those portions of the subject that are semitransparent, by removing all elements of the background surrounding the subject, and also removing those background elements visible through semitransparent areas of the subject, when said background is busy, detailed, and in sharp focus, where said method comprises the steps of;

a) drawing, on a display of said image, an inner boundary line on the subject near to a edge of said subject, b) drawing an outer boundary line on said display, on the background near to the edge of said subject but spaced at a distance sufficient to avoid inclusion of any element of said subject, c) generating a Clear Frame by filling the area inside said outer boundary line with RGB levels generated by interpolation and/or extrapolation of the RGB levels existing on and/or outside said outer boundary line, d) generating an Expanded Subject Frame by replacing the RGB levels in the area bounded by said inner and outer boundary lines with RGB levels generated by extrapolation of the RGB levels existing on and/or inside said inner boundary line, e) calculating M1, an estimated Percent Background RGB Contribution to each pixel in the bounded area using the following equation:

percentage background contribution=$(F(pixRGB)-F(subRGB)) / (F(bgRGB)-F(subRGB))$, where:
percentage background contribution is defined as matte signal M1,
F is any linear function of the form,
$F(RGB)=k_1R+k_2G+k_3B$,
pixRGB is observed RGB at a pixel at a given address in the bounded area,
subRGB is RGB obtained from the Expanded Subject Frame at said given address,
bgRGB is RGB obtained from the Clear Frame at said given address, f) subtracting said matte signal M1 of step "e" from 1.0 to generate a Reversed Matte signal (1−M1), g) generating Processed Foreground 1, (PrFg1), where, PrFg1=(1−M1)*subRGB h) generating Processed Background 1, (PrBg1), where PrBg1=pixRGB−PrFg1 i) generating the reversed Clear Frame (bgRGB2), where reversed Clear Frame bgRGB 2=(1−M1)*bgRGB j) generating the Reversed Clear Frame bgRGB 3, where bgRGB 3=PrBg1+bgRGB 2 k) generating the Final Matte M2, where $$M2 = \frac{F(pixRGB) - F(subRGB)}{F(bgRGB3) - F(subRGB)}$$

l) generating Processed Foreground 2PrFg 2, where PrFg 2=pixRGB−(M2*bgRGB3)

and said Processed Foreground 2 is the subject as though photographed against a black backing, with no remaining elements of a detailed, sharply focused background surrounding the subject nor any residual background in semitransparent areas of the subject.

11. The method of claim 10, in which the reversed matte (1−M1) is calculated directly by using the equation:

$$\text{Reversed Matte } (1 - M1) = \frac{F(brRGB) - F(pixRGB)}{F(bgRGB) - F(subRGB)}.$$

12. A method for determining, in an image, an estimated contribution of background color to an observed color at a given pixel in a semitransparent area of a foreground subject, when the color of the background near said pixel in said semitransparent area is known, declared, or can be estimated, and the color of the subject near said pixel in said semitransparent area is known, declared, or can be estimated, said method comprising the steps of:

a) representing said known, declared, or estimated background color RGB levels (bgRGB) as a point (9) in a three dimensional color space, b) representing said known, declared or estimated foreground color RGB levels (subRGB) as a second point (11) in said color space, c) representing said given pixel observed color RGB levels (pixRGB) as a third point (10) in said color space, d) calculating an estimate of the percent contribution of the background color to the observed color of said given pixel by determining the ratio of the distance, in color space, from pixRGB to subRGB, divided by the distance, in color space, from bgRGB to subRGB, where said calculation of distance utilizes the numerical values of at least one linear functions of F(RGB), where $F(RGB)=k_1R+k_2G+k_3B$.

13. The method of claim 12 in which the function F(RGB) is at least one of the following:

$F_1(RGB)=B$,
$F_2(RGB)=G$
$F_3(RGB)=R$
$F_4(RGB)=B-G$ $F_5(RGB)=B-R$ $F_6(RGB)=G-R$.

14. The method of claim 12 in which a percentage contribution of the background to an observed pixel in the transition area is obtained from a ratio, and said ratio is computed for the functions:

$F_1(RGB)=B$, $F_2(RGB)=G$ $F_3(RGB)=R$ $F_4(RGB)=B-G$ $F_5(RGB)=B-R$ $F_6(RGB)=G-R$.

and said percentage background contribution is a weighted sum of said ratios, and said weighting increases as a absolute difference of a denominator of said ratio increases.

15. The method of claim 12 in which said semitransparent subject area is defined as those pixels, anywhere in the image frame, whose said percent contribution of the background is determined to be greater than zero and less than 1.0.

16. The method of claim 12 in which said estimated foreground and background colors near said semitransparent area are assigned by an operator.

17. The method of claim 12 in which the Matte signal in the bounded area is that calculation that results in a largest denominator when calculating percent contribution of the background.

18. The method of claim 12 in which the bgRGB, pixRGB and subRGB are represented as points in a two dimensional color space.

19. The method of claim 18 in which the two dimensional color space is a Commision internationale de l'Eclairage (CIE) chromaticity diagram.

* * * * *

UNITED STATES PATENT AND TRADEMARK OFFICE
CERTIFICATE OF CORRECTION

PATENT NO. : 6,134,346
APPLICATION NO. : 09/008270
DATED : October 17, 2000
INVENTOR(S) : Berman et al.

It is certified that error appears in the above-identified patent and that said Letters Patent is hereby corrected as shown below:

In the Title page, please insert item [73], -- [73] Assignee: Ultimatte Corporation, Chatsworth, Calif. -- .

In Item [56], References Cited, U.S. Patent Documents, in the first entry please delete "Viahos" and insert -- Vlahos --.

In Item [56], References Cited, U.S. Patent Documents, in the third entry please delete "Viahos" and insert -- Vlahos --.

In the title page please insert --Item (74), Attorney, Agent or Firm – Blakely Sokoloff Taylor & Zafman LLP --.

In Claim #10, column 11, line 40, please delete "a edge" and insert -- an edge --

In Claim #14, column 13, line 4, please delete "in the" and insert -- in a --.

In Claim #19, column 14, line 15, please delete "internationale" and insert -- Internationale --.

Signed and Sealed this

Twenty-second Day of May, 2007

JON W. DUDAS
*Director of the United States Patent and Trademark Office*